United States Patent [19]

Karol et al.

[11] 4,302,566

[45] Nov. 24, 1981

[54] PREPARATION OF ETHYLENE COPOLYMERS IN FLUID BED REACTOR

[75] Inventors: Frederick J. Karol; George L. Goeke, both of Belle Mead; Burkhard E. Wagner, Highland Park; William A. Fraser, Princeton, all of N.J.; Robert J. Jorgensen, Dunbar, W. Va.; Nils Friis, Macungie, Pa.

[73] Assignee: Union Carbide Corporation, New York, N.Y.

[21] Appl. No.: 14,414

[22] Filed: Feb. 27, 1979

Related U.S. Application Data

[63] Continuation-in-part of Ser. No. 892,325, Mar. 31, 1978, abandoned.

[51] Int. Cl.³ .............................................. C08F 4/64
[52] U.S. Cl. .................................. 526/125; 526/348; 526/348.6
[58] Field of Search ............ 526/124, 125, 348, 348.2, 526/348.3, 348.4, 348.5, 348.6, 348.7

[56] References Cited

U.S. PATENT DOCUMENTS

| 2,839,515 | 6/1958 | Davison | 526/348 |
|---|---|---|---|
| 3,073,809 | 1/1963 | Kluiber | 526/348.5 |
| 3,642,746 | 2/1972 | Kashiwa | 526/125 |
| 3,645,992 | 2/1972 | Elston | 526/348.2 |
| 3,888,835 | 6/1975 | Ito | 526/125 |
| 3,920,621 | 11/1975 | Baxmann | 526/348.7 |
| 4,035,560 | 7/1977 | Caumartin | 526/124 |
| 4,107,413 | 8/1978 | Giannini | 526/124 |
| 4,107,414 | 8/1978 | Giannini | 526/114 |
| 4,107,415 | 8/1978 | Giannini | 526/124 |
| 4,143,223 | 3/1979 | Toyota | 526/151 |

FOREIGN PATENT DOCUMENTS 1502567 3/1978 United Kingdom .

Primary Examiner—Paul R. Michl
Attorney, Agent, or Firm—John S. Piscitello

[57] ABSTRACT

Ethylene copolymers having a density of $\geq 0.91$ to $\leq 0.96$ and a melt flow ratio of $\geq 22$ to $\leq 32$ are readily produced in a low pressure gas phase process at a productivity of $\geq 50,000$ pounds of polymer per pound of Ti with a particulate catalyst diluted with an inert carrier material and formed from selected organo aluminum compounds and a precursor composition of the formula:

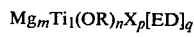

$$Mg_m Ti_1(OR)_n X_p [ED]_q$$

wherein ED is a selected electron donor compound.
m is $\geq 0.5$ to $\leq 56$
n is 0 or 1
p is $\geq 6$ to $\leq 116$
q is $\geq 2$ to $\leq 85$
R is a $C_1$ to $C_{14}$ aliphatic or aromatic hydrocarbon radical, or COR' wherein R' is a $C_1$ to $C_{14}$ aliphatic or aromatic hydrocarbon radical, and
X is selected from the group consisting of Cl, Br, I, or mixtures thereof.

12 Claims, 1 Drawing Figure

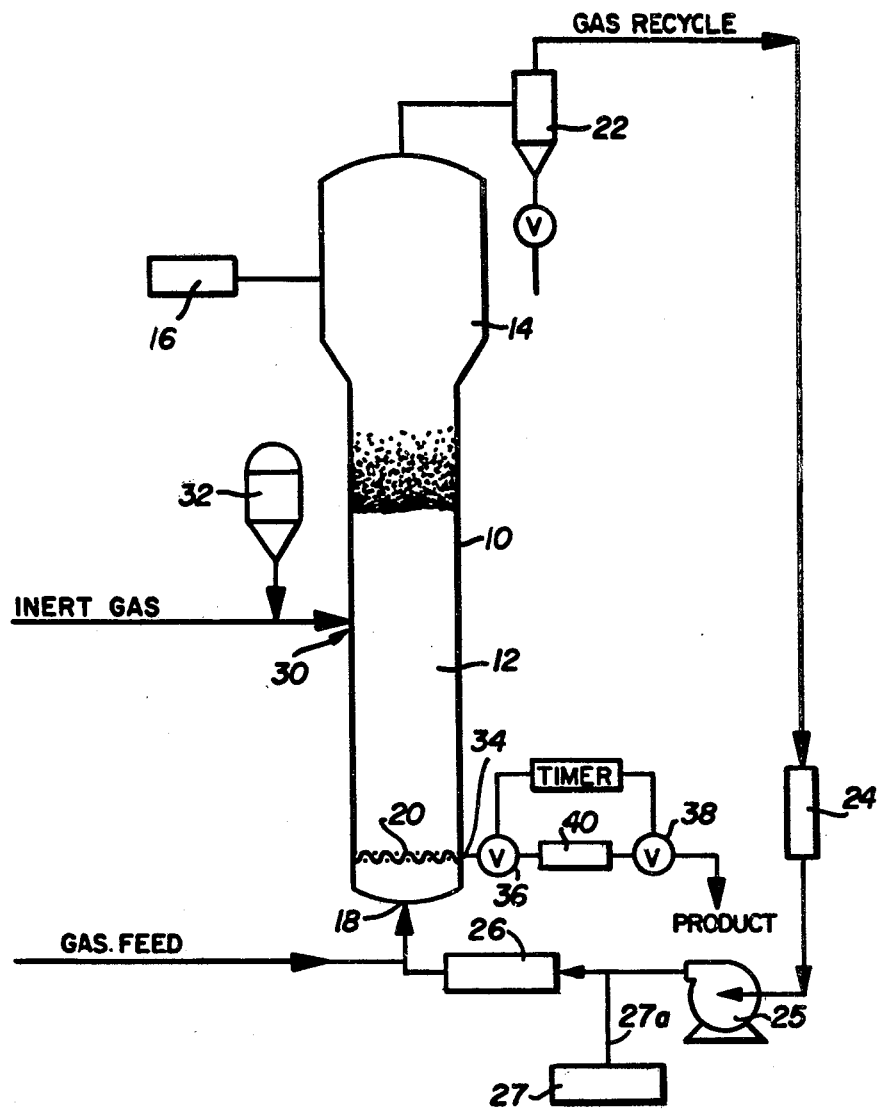

PREPARATION OF ETHYLENE COPOLYMERS IN FLUID BED REACTOR

This application is a continuation-in-part of copending application Ser. No. 892,325 filed Mar. 31, 1978, now abandoned.

BACKGROUND OF THE INVENTION

1. Field of the Invention

The invention relates to the catalytic copolymerization of ethylene with high activity Mg and Ti containing complex catalysts in a low pressure gas phase process to produce polymers having a density of $\geq 0.91$ to $\leq 0.96$ and a melt flow ratio of $\geq 22$ to $\leq 32$.

2. Description of the Prior Art

Until recently, low density ($\leq 0.940$) polyethylene has been produced commercially, for the most part, by the high pressure ($\geq 15,000$ psi) homopolymerization of ethylene in the gas phase in stirred and elongated tubular reactors in the absence of solvents using free radical initiators. On a world wide basis, the amount of low density polyethylene produced in this fashion, annually, amounts to more than thirteen (13) billion pounds.

As recently disclosed in U.S. Pat. No. 4,011,382 and in Belgian Pat. No. 839,380 it has been found that low density polyethylene can be produced commercially at pressures of <1000 psi in a gas phase reaction in the absence of solvents by employing selected chromium and titanium (and, optionally, fluorine) containing catalysts under specific operating conditions in a fluid bed process.

The products produced by the process of U.S. Pat. No. 4,011,382 and Belgian Pat. No. 839,380, however, have a relatively broad molecular weight distribution (Mw/Mn) of $\geq 6$ to $\leq 20$. As such, although readily useful for a large number of applications in the areas of wire and cable insulation and molded pipe they are not broadly useful in the areas of injection molding applications. They are also not broadly used in the area of film applications because of the poor optical and mechanical properties of films made from such resins.

To be commercially useful in a gas phase process, such as the fluid bed processes of U.S. Pat. Nos. 3,709,853; 4,003,712 and 4,011,382 and Canadian Pat. No. 991,798 and Belgian Pat. No. 839,380, the catalyst employed must be a high activity catalyst, that is, it must have a level of productivity of $\geq 50,000$, and preferably $\geq 100,000$, pounds of polymer per pound of primary metal in the catalyst. This is so because such gas phase processes usually do not employ any catalyst residue removing procedures. Thus, the catalyst residue in the polymer must be so small that it can be left in the polymer without causing any undue problems in the hands of the resin fabricator and/or ultimate consumer. Where a high activity catalyst is successfully used in such fluid bed processes, the heavy metal content of the resin is of the order of $\leq 20$ parts per million (ppm) of primary metal at a productivity level of $\geq 50,000$ and of the order of $\leq 10$ ppm at a productivity level of $\geq 100,000$, and of the order of $\leq 3$ ppm at a productivity level of $\geq 300,000$. Low catalyst residue contents are also important where the catalyst is made with chlorine containing materials such as the titanium, magnesium and/or aluminum chlorides used in some so-called Ziegler or Ziegler-Natta catalysts. High residual chlorine values in a molding resin will cause pitting and corrosion on the metal surfaces of the molding devices. Cl residues of the order of $\geq 200$ ppm are not commercially useful.

U.S. Pat. No. 3,989,881 discloses the use of a high activity catalyst for the manufacture, under slurry polymerization conditions, of ethylene polymers having a relatively narrow molecular weight distribution (Mw/Mn) of about 2.7 to 3.1. Attempts were made to use catalysts similar to those described in U.S. Pat. No. 3,989,881 for the purpose of making polyethylene of narrow molecular weight distribution by polymerizing ethylene alone or with propylene in the gas phase in a fluid bed process using apparatus and conditions similar to those employed in U.S. Pat. No. 4,001,382 and Belgian Pat. No. 839,380. These attempts were not successful. In order to avoid the use of the solvents in the slurried catalyst systems of U.S. Pat. No. 3,989,881 the Ti/Mg containing components were dried. However, the dried material, a viscous, gummy, pyrophoric composition, could not be readily fed to the reactor because it was not in a free flowing form. Even when blended with silica, to improve its free flowing properties and then added to the reactor the results were commercially unacceptable. The productivity of the catalyst was poor, or the catalyst was pyrophoric and difficult to handle, or the polymer product had a low bulk density i.e., of the order of $\leq 6$ pounds/cubic foot at a density of $\leq 0.940$. Materials having such a low bulk density cannot be fluidized in a fluid bed process under acceptable operating conditions.

Polymers of such low bulk density are also not commercially desirable because they are fluffy. If the polymer is to be stored or sold in granular form, significantly larger amounts of storage and shipping space is required for handling these materials. Even if the granular polymer is to be pelletized prior to shipping, the processing of a given quantity of the low bulk density material through the pelletizing equipment requires significantly longer processing times than would the same quantity of high bulk density materials, when using the same extrusion equipment.

U.S. Pat. No. 4,124,532 discloses the polymerization of ethylene and propylene with high activity catalysts. These catalysts comprise complexes which may contain magnesium and titanium. These complexes are prepared by reacting the halide $MX_2$ (where M may be Mg) with a compound M'Y (where M' may be Ti and Y is halogen or an organic radical) in an electron donor compound. These complexes are then isolated by either crystallization, by evaporation of the solvent or by precipitation.

Polymerization is carried out with these complexes and an alkyl aluminum compound.

However, U.S. Pat. No. 4,124,532 does not disclose any special techniques or methods of preparing the catalyst in order to achieve the desirable results described in the present invention. The use of the catalysts described in U.S. Pat. No. 4,124,532, without these special methods, would not lead to a commercial fluid bed process to produce polyethylenes at commercial rates. In addition the examples in the gas phase do not describe copolymerization to produce high density polyethylene copolymer, let alone a practical process for producing the special low density copolymers described in our present invention.

U.S. Pat. Nos. 3,922,322 and 4,035,560 disclose the use of several Ti and Mg containing catalyst for the manufacture of granular ethylene polymers in a gas phase fluid bed process under a pressure of <1000 psi. The use of these catalysts in these processes, however, has significant disadvantages. The catalysts of U.S. Pat. No. 3,922,322 provide polymers having a very high catalyst residue content, i.e., about 100 ppm of Ti and greater than about 300 ppm Cl, according to the working example of this patent. Further, as disclosed in the working example of U.S. Pat. No. 3,922,322 the catalyst is used in the form of a prepolymer, and very high volumes of the catalyst composition must be fed to the reactor. The preparation and use of this catalyst thus requires the use of relatively large sized equipment for the manufacture, storage and transporting of the catalyst.

The catalysts of U.S. Pat. No. 4,035,560 also apparently provide polymers having high catalyst residues, and the catalysts compositions are apparently pyrophoric because of the types and amounts of reducing agents employed in such catalysts.

SUMMARY OF THE INVENTION

It has now been unexpectedly found that ethylene copolymers having a wide density range of 0.91 to 0.96 and a melt flow ratio of $\geq 22$ to $\leq 32$ and which have a relatively low residual catalyst content can be produced at relatively high productivities for commercial purposes by a gas phase process if the ethylene is copolymerized with one or more $C_3$ to $C_8$ alpha olefins in the presence of a high activity magnesium-titanium complex catalyst prepared, as described below, under specific activation conditions with an organo aluminum compound and an inert carrier material.

An object of the present invention is to provide a process for producing, with relatively high productivities and in a low pressure gas phase process, ethylene copolymers which have a density of about 0.91 to 0.96, a melt flow ratio of about 22 to 32 and a relatively low residual catalyst content.

A further object of the present invention is to provide a process in which ethylene copolymers, which are useful for a variety of end-use applications, may be readily prepared.

A still further object of the present invention is to provide a variety of novel ethylene copolymers.

BRIEF DESCRIPTION OF THE DRAWINGS

The drawing shows a gas phase fluid bed reactor system in which the catalyst system of the present invention may be employed.

DESCRIPTION OF THE PREFERRED EMBODIMENT

It has now been found that the desired ethylene copolymers having a low melt flow ratio and a wide range of density values can be readily produced with relatively high productivities in a low pressure gas phase fluid bed reaction process if the monomer charge is polymerized under a specific set of operating conditions, as detailed below, and in the presence of a specific high activity catalyst, as is also detailed below.

The Ethylene Copolymers

The copolymers which may be prepared in the process of the present invention are copolymers of a major mol percent ($\geq 90\%$) of ethylene, and a minor mol percent ($\leq 10\%$) of one (copolymer) or more (ter-, tetrapolymers) $C_3$ to $C_8$ alpha olefins. The $C_3$ to $C_8$ alpha olefins should not contain any branching on any of their carbon atoms which is closer than the fourth carbon atom. These alpha olefins include propylene, butene-1, pentene-1, hexene-1, 4-methyl pentene-1, heptene-1, and octene-1. The preferred alpha olefins are propylene, butene-1, hexene-1, 4-methyl pentene-1, and octene-1.

The copolymers have a melt flow ratio of $\geq 22$ to $\leq 32$, and preferably of $\geq 25$ to $\leq 30$. The melt flow ratio value is another means of indicating the molecular weight distribution of a polymer. The melt flow ratio (MFR) range of $\geq 22$ to $\leq 32$ thus corresponds to a Mw/Mn value range of about 2.7 to 4.1 and the MFR range of $\geq 25$ to $\leq 30$ corresponds to Mw/Mn range of about 2.8 to 3.6.

The copolymers have a density of about $\geq 0.91$ to $\leq 0.96$. The density of the copolymer, at a given melt index level for the copolymer, is primarily regulated by the amount of the $C_3$ to $C_8$ comonomer which is copolymerized with the ethylene. In the absence of the comonomer, the ethylene would homopolymerize with the catalyst of the present invention to provide homopolymers having a density of about $\geq 0.96$. Thus, the addition of progressively larger amounts of the comonomers to the copolymers results in a progressive lowering of the density of the copolymer. The amount of each of the various $C_3$ to $C_8$ comonomers needed to achieve the same result will vary from monomer to monomer, under the same reaction conditions.

Thus, to achieve the same results, in the copolymers, in terms of a given density, at a given melt index level, larger molar amounts of the different comonomers would be needed in the order of $C_3 > C_4 > C_5 > C_6 > C_7 > C_8$.

The melt index of a copolymer is a reflection of its molecular weight. Polymers having a relatively high molecular weight, have a relatively low melt index. Ultrahigh molecular weight ethylene polymers have a high load (HLMI) melt index of about 0.0 and very high molecular weight polymers have a high load melt index (HLMI) of about 0.0 to about 1.0. Such high molecular weight polymers are difficult, if not impossible, to mold in conventional injection molding equipment. The polymers made in the process of the present invention, on the other hand, can be readily molded in such equipment. They have a standard or normal load melt index of $\geq 0.0$ to about 100, and preferably of about 0.5 to 80, and a high load melt index (HLMI) of about 11 to about 2000. The melt index of the copolymers which are made in the process of the present invention is a function of a combination of the polymerization temperature of the reaction, the density of the copolymer and the hydrogen/monomer ratio in the reaction system. Thus, the melt index is raised by increasing the polymerization temperature and/or by decreasing the density of the polymer and/or by increasing the hydrogen/monomer ratio. In addition to hydrogen, other chain transfer agents such as dialkyl zinc compounds may also be used to further increase the melt index of the copolymers.

The copolymers of the present invention have an unsaturated group content of $\leq 1$, and usually of $\geq 0.1$ to $\leq 0.3$, C=C/1000 carbon atoms.

The copolymers of the present invention have a n-hexane extractables content (at 50° C.) of less than about 3, and preferably, of less than about 2 weight percent.

The copolymers of the present invention have a residual catalyst content, in terms of parts per million of titanium metal of the order of $>0$ to $\leq 20$ parts per million (ppm) at a productivity level of $\geq 50,000$, and of the order of $>0$ to $\leq 10$ ppm at a productivity level of $\geq 100,000$ and of the order of $>0$ to $\leq 3$ parts per million at a productivity level of $\geq 300,000$. In terms of Cl, Br or I residues, the copolymers of the present invention have a Cl, Br or I residue content which depends upon the Cl, Br or I content of the precursor. From the Ti to Cl, Br or I ratio in the initial precursor, it is possible to calculate Cl, Br or I residues from the knowledge of the productivity level based on titanium residues only. For many of the copolymers of the present invention made only with Cl containing components of the catalyst system (Cl/Ti=7), one can calculate a Cl residue content of $>0$ to $\leq 140$ ppm at a productivity of $\geq 50,000$, a Cl content of $>0$ to $\leq 70$ ppm at a productivity of $\geq 100,000$, and a Cl content of $>0$ to $\leq 20$ ppm at a productivity of $\geq 300,000$. The copolymers are readily produced in the process of the present invention at productivities of up to about 1,000,000.

The copolymers of the present invention are granular materials which have an average particle size of the order of about 0.005 to about 0.07 inches and preferably, of about 0.02 to about 0.04 inches, in diameter. The particle size is important for the purposes of readily fluidizing the polymer particles in the fluid bed reactor, as described below. The compolymers of the present invention have a bulk density of about 15 to 31 pounds per cubic foot.

For film making purposes the preferred copolymers of the present invention are those having a density of $\geq 0.912$ to $\leq 0.940$ and preferably of about $\geq 0.916$ to $\leq 0.928$; a molecular weight distribution (Mw/Mn) of $\geq 2.7$ to $\leq 3.6$, and preferably of about $\geq 2.8$ to 3.1; and a standard melt index of $\geq 0.5$ to $\leq 5.0$ and preferably of about $\geq 0.7$ to $\leq 4.0$.

For the injection molding of flexible articles such as houseware materials, the preferred copolymers of the present invention are those having a density of $\geq 0.920$ to $\leq 0.940$ and preferably, of about $\geq 0.925$ to $\leq 0.930$; a molecular weight distribution Mw/Mn of $\geq 2.7$ to $\leq 3.6$, and preferably, about $\geq 2.8$ to $\leq 3.1$; and a standard melt index of $\geq 2$ to $\leq 100$ and preferably, of about $\geq 8$ to $\leq 80$.

For the injection molding of rigid articles such as pails, the preferred copolymers of the present invention are those having a density of $\geq 0.950$ to $\leq 0.958$, and preferably, of about $\geq 0.953$ to $\leq 0.955$, a molecular weight distribution (Mw/Mn) of $\geq 2.7$ to $\leq 3.6$, and preferably of about $\geq 2.8$ to $\leq 3.1$, and a standard melt index of $\geq 1$ to $\leq 40$, and preferably of about $\geq 5$ to $\leq 20$.

High Activity Catalyst

The compounds used to form the high activity catalyst used in the present invention comprise at least one titanium compound, at least one magnesium compound, at least one electron donor compound, at least one activator compound and at least one inert carrier material, as defined below.

The titanium compound has the structure

wherein
R is a $C_1$ to $C_{14}$ aliphatic or aromatic hydrocarbon radical, or COR' where R' is a $C_1$ to $C_{14}$ aliphatic or aromatic hydrocarbon radical,
X is selected from the group consisting of Cl, Br, I, or mixtures thereof, a is 0 to 1, b is 2 to 4 inclusive and a+b=3 or 4.

The titanium compounds can be used individually or in combinations thereof, and would include $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$.

The magnesium compound has the structure wherein X is selected from the group consisting of Cl, Br, I, or mixtures thereof. Such magnesium compounds can be used individually or in combinations thereof and would include $MgCl_2$, $MgBr_2$ and $MgI_2$. Anhydrous $MgCl_2$ is the particularly preferred magnesium compound.

About 0.5 to 56, and preferably about 1 to 10, mols of the magnesium compound are used per mol of the titanium compound in preparing the catalysts employed in the present invention.

The titanium compound and the magnesium compound should be used in a form which will facilitate their dissolution in the electron donor compound, as described herein below.

The electron donor compound is an organic compound which is liquid at 25° C. and in which the titanium compound and the magnesium compound are partially or completely soluble. The electron donor compounds are known as such or as Lewis bases.

The electron donor compounds would include such compounds as alkyl esters of aliphatic and aromatic carboxylic acids, aliphatic ethers, cyclic ethers and aliphatic ketones. Among these electron donor compounds the preferable ones are alkyl esters of $C_1$ to $C_4$ saturated aliphatic carboxylic acids; alkyl esters of $C_7$ to $C_8$ aromatic carboxylic acids; $C_2$ to $C_8$, and preferably $C_3$ to $C_4$, aliphatic ethers; $C_3$ to $C_4$ cyclic ethers, and preferably $C_4$ cyclic mono- or di-ether; $C_3$ to $C_6$, and preferably $C_3$ to $C_4$, aliphatic ketones; The most preferred of these electron donor compounds would include methyl formate, ethyl acetate, butyl acetate, ethyl ether, hexyl ether, tetrahydrofuran, dioxane, acetone and methyl isobutyl ketone.

The electron donor compounds can be used individually or in combinations thereof.

About 2 to 85, and preferably about 3 to 10 mols of the electron donor compound are used per mol of Ti.

The activator compound has the structure $$Al(R'')_cX'_dH_e$$

wherein X' is Cl or OR''', R'' and R''' are the same or different and are $C_1$ to $C_{14}$ saturated hydrocarbon radicals, d is 0 to 1.5, e is 1 or 0 and c+d+e=3.

Such activator compounds can be used individually or in combinations thereof and would include $Al(C_2H_5)_3$, $Al(C_2H_5)_2Cl$, $Al(i-C_4H_9)_3$, $Al_2(C_2H_5)_3Cl_3$, $Al(i-C_4H_9)_2H$, $Al(C_6H_{13})_3$, $Al(C_8H_{17})_3$, $Al(C_2H_5)_2H$ and $Al(C_2H_5)_2(OC_2H_5)$.

About 10 to 400, and preferably about 10 to 100, mols of the activator compound are used per mol of the titanium compound in activating the catalyst employed in the present invention.

The carrier materials are solid, particulate materials which are inert to the other components of the catalyst composition, and to the other active components of the reaction system. These carrier materials would include inorganic materials such as oxides of silicon and aluminium and molecular sieves, and organic materials such as olefin polymers such as polyethylene. The carrier materials are used in the form of dry powders having an average particle size of about 10 to 250, and preferably of about 50 to 150 microns. These materials are also preferably porous and have a surface area of $\geq 3$, and preferably of $\geq 50$, square meters per gram. The carrier material should be dry, that is, free of absorbed water. Drying of the carrier material is carried out by heating it at a temperature of ≧600° C. Alternatively, the carrier material dried at a temperature of ≧200° C. may be treated with about 1 to 8 weight percent of one or more of the aluminum alkyl compounds described above. This modification of the support by the aluminum alkyl compounds provides the catalyst composition with increased activity and also improves polymer particle morphology of the resulting ethylene polymers.

Catalyst Preparation

The catalyst used in the present invention is prepared by first preparing a precursor composition from the titanium compound, the magnesium compound, and the electron donor compound, as described below, and by then treating the precursor composition with the carrier material and the activator compound in one or more steps as described below.

The precursor composition is formed by dissolving the titanium compound and the magnesium compound in the electron donor compound at a temperature of about 20° C. up to the boiling point of the electron donor compound. The titanium compound can be added to the electron donor compound before or after the addition of the magnesium compound, or concurrent therewith. The dissolution of the titanium compound and the magnesium compound can be facilitated by stirring, and, in some instances by refluxing, these two compounds in the electron donor compound. When the titanium compound and the magnesium compound are dissolved, the precursor composition is isolated by crystallization or by precipitation with a $C_5$ to $C_8$ aliphatic or aromatic hydrocarbon such as hexane, isopentane or benzene.

The crystallized or precipitated precursor composition is isolated in the form of fine, free flowing particles having an average particle size of about 10 to 100 microns and a bulk density of about 18 to 33 pounds per cubic foot.

Particle sizes of ≦100μ are preferred for use in a fluid bed process. The particle size of the isolated precursor composition can be controlled by the rate of crystallization or precipitation.

When thus made as disclosed above, the precursor composition has the formula

wherein
ED is the electron donor compound,
m is ≧0.5 to ≦56, and preferably ≧1.5 to ≦5.0,
n is 0 to 1,
p is ≧6 to ≦116, and preferably ≧6 to ≦14,
q is ≧2 to ≦85, and preferably ≧4 to ≦11,
R is a $C_1$ to $C_{14}$ aliphatic or aromatic hydrocarbon radical, or COR' wherein R' is a $C_1$ to $C_{14}$ aliphatic or aromatic hydrocarbon radical and,
X is selected from the group consisting of Cl, Br, I, or mixture thereof,
The subscript for the element titanium (Ti) is the arabic numeral one.

The polymerization activity of the completely activated catalyst is so high, in the process of the invention, that a dilution of the precursor composition with the carrier material is necessary in order to effectively control the reaction rate. The dilution of the precursor composition can be accomplished before the precursor composition is partially or completely activated, as disclosed below, or concurrent with such activation. The dilution of the precursor composition is accomplished by mechanically mixing or blending about 0.033 to 1, and preferably about 0.1 to 0.33, parts of the precursor composition with one part by weight of the carrier material.

In order to be used in the process of the present invention the precursor composition must be fully or completely activated, that is, it must be treated with sufficient activator compound to transform the Ti atoms in the precursor composition to an active state. It has been found, however, that the manner of activating the catalyst is very critical in order to obtain an active material, even when an inert carrier is present. Attempts to activate the catalyst by a process similar to that of U.S. Pat. No. 3,989,881, for example, wherein the total amount of reducing agent theoretically needed to fully activate the catalyst was added to the precursor composition in a hydrocarbon slurry, followed by drying of the slurry at temperatures of ≧20° to ≦80° C. to remove the solvent therefrom to facilitate the use of the catalyst in a gas phase process, produced a product which was not sufficiently active in the gas phase fluid bed process otherwise described below for commercial purposes.

It has been found that, in order to prepare a useful catalyst, it is necessary to conduct the activation in such a way that, at least, the final activation stage must be conducted in the absence of solvent so as to avoid the need for drying the fully active catalyst to remove solvent therefrom. Two procedures have been developed to accomplish this result. In one procedure, the precursor composition is completely activated, outside the reactor, in the absence of solvent, by dry blending the precursor composition with the activator compound. In this dry blending procedure the activator compound is used while absorbed on a carrier material. This procedure had a disadvantage, however, in that the resulting dry, fully activated catalyst is pyrophoric where it contains ≧10 weight percent of the activator compound.

In the second, and preferred, of such catalyst activation procedures, the precursor composition is partially activated outside the polymerization reactor with activator compound in a hydrocarbon slurry, the hydrocarbon solvent is removed by drying and the partially activated precursor composition is fed to the polymerization reactor where the activation is completed with additional activator compound which can be the same or a different compound.

Thus, in the dry blending catalyst making procedure the solid particulate precursor composition is added to and evenly blended with solid particles of porous carrier material wherein the activator compound is absorbed. The activator compound is absorbed on the carrier material, from a hydrocarbon solvent solution of the activator compound, so as to provide a loading of about 10 to 50 weight percent of activator compound on 90 to 50 weight percent of carrier material. The amounts of the precursor composition, activator compound and carrier material that are employed are such as to provide the desired Al/Ti molar ratios and to provide a final composition having a weight ratio of precursor composition to carrier material of less than about 0.50, and preferably of less than about 0.33. This amount of carrier material thus provides the necessary dilution therewith of the activated catalyst so as to provide the desired control of the polymerization activity of the catalyst in the reactor. Where the final compositions contain about ≧10 weight percent of the activator compound, they will be pyrophoric. During the dry blending operation, which may be conducted at ambient (25° C.) or lower temperatures, the dry mixture is well agitated to avoid any heat build-up during the ensuing reduction reaction which is exothermic, initially. The resulting catalyst is thus completely reduced and activated and can be fed to, and used as such in, the polymerization reactor. It is a free-flowing particulate material.

In the second, and preferred catalyst activation procedure, the activation is conducted in at least two stages. In the first stage the solid particulate precursor composition, diluted with carrier material, is reacted with and partially reduced by enough activator compound so as to provide a partially reduced precursor composition which has an activator compound/Ti molar ratio of about 1 to 10:1 and preferably of about 4 to 8:1. This partial activation reaction is preferably carried out in a hydrocarbon solvent slurry followed by drying of the resulting mixture, to remove the solvent, at temperatures between 20 to 80, and preferably of 50° to 70° C. In this partial activation procedure the activator compound may be used while absorbed on the carrier material used to dilute the activator compound. The resulting product is a free-flowing solid particulate material which can be readily fed to the polymerization reactor. The partially activated precursor composition, however, is, at best, weakly active as a polymerization catalyst in the process of the present invention. In order to render the partially activated precursor composition active for ethylene polymerization purposes, additional activator compound must also be added to the polymerization reactor to complete, in the reactor, the activation of the precursor composition. The additional activator compound and the partially activated precursor composition are preferably fed to the reactor through separate feed lines. The additional activator compound may be sprayed into the reactor in the form of a solution thereof in a hydrocarbon solvent such as isopentane, hexane, or mineral oil. This solution usually contains about 2 to 30 weight percent of the activator compound. The activator compound may also be added to the reactor in solid form, by being absorbed on a carrier material. The carrier material usually contains 10 to 50 weight percent of the activator for this purpose. The additional activator compound is added to the reactor in such amounts as to provide, in the reactor, with the amounts of activator compound and titanium compound fed with the partially activated precursor composition, a total Al/Ti molar ratio of about 10 to 400 and preferably of about 15 to 60. The additional amounts of activator compound added to the reactor, react with, and complete the activation of, the titanium compound in the reactor.

In a continuous gas phase process, such as the fluid bed process disclosed below, discrete portions of the partially or completely activated precursor composition are continuously fed to the reactor, with discrete portions of any additional activator compound needed to complete the activation of the partially activated precursor composition, during the continuing polymerization process in order to replace active catalyst sites that are expended during the course of the reaction.

The Polymerization Reaction

The polymerization reaction is conducted by contacting a stream of the monomers, in a gas phase process, such as in the fluid bed process described below, and substantially in the absence of catalyst poisons such as moisture, oxygen, CO, $CO_2$, and acetylene with a catalytically effective amount of the completely activated precursor composition (the catalyst) at a temperature and at a pressure sufficient to initiate the polymerization reaction.

In order to achieve the desired density ranges in the copolymers it is necessary to copolymerize enough of the $\geq C_3$ comonomers with ethylene to achieve a level of $\geq 0$ to 10 mol percent of the $C_3$ to $C_8$ comonomer in the copolymer. The amount of comonomer needed to achieve this result will depend on the particular comonomer(s) employed.

There is provided below a listing of the amounts, in mols, of various comonomers that must be copolymerized with ethylene in order to provide polymers having the desired density range at any given melt index. The listing also indicates the relative molar concentration, of such comonomer to ethylene, which should be present in the gas stream of monomers which is fed to the reactor.

| Comonomer | mol % needed in copolymer | Gas Stream Comonomer/Ethylene molar ratio |
|---|---|---|
| propylene | >0 to 10 | >0 to 0.9 |
| butene-1 | >0 to 7.0 | >0 to 0.7 |
| pentene-1 | >0 to 6.0 | >0 to 0.45 |
| hexene-1 | >0 to 5.0 | >0 to 0.4 |
| octene-1 | >0 to 4.5 | >0 to 0.35 |

A fluidized bed reaction system which can be used in the practice of the process of the present invention is illustrated in FIG. 1. With reference thereto the reactor 10 consists of a reaction zone 12 and a velocity reduction zone 14.

The reaction zone 12 comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow required for fluidization, and preferably from about 1.5 to about 10 times $G_{mf}$ and more preferably from about 3 to about 6 times $G_{mf}$. $G_{mf}$ is used in the accepted form as the abbreviation for the minimum mass gas flow required to achieve fluidization, C. Y. Wen and Y. H. Yu, "Mechanics of Fluidization", Chemical Engineering Progress Symposium Series, Vol. 62, p. 100–111 (1966).

It is essential that the bed always contains particles to prevent the formation of localized "hot spots" and to entrap and distribute the particulate catalyst throughout the reaction zone. On start up, the reaction zone is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The partially or completely activated precursor compound (the catalyst) used in the fluidized bed is preferably stored for service in a reservoir 32 under a blanket of a gas which is inert to the stored material, such as nitrogen or argon.

Fluidization is achieved by a high rate of gas recycle to and through the bed, typically in the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the crosssectional area. It is thus dependent on the geometry of the reactor.

Make-up gas is fed to the bed at a rate equal to the rate at which particulate polymer product is withdrawn. The composition of the make-up gas is determined by a gas analyzer 16 positioned above the bed. The gas analyzer determines the composition of the gas being recycled and the composition of the make-up gas is adjusted accordingly to maintain an essentially steady state gaseous composition within the reaction zone.

To insure complete fluidization, the recycle gas and, where desired, part of the make-up gas are returned to the reactor at point 18 below the bed. There exists a gas distribution plate 20 above the point of return to aid fluidizing the bed.

The portion of the gas stream which does not react in the bed constitutes the recycle gas which is removed from the polymerization zone, preferably by passing it into a velocity reduction zone 14 above the bed where entrained particles are given an opportunity to drop back into the bed. Particle return may be aided by a cyclone 22 which may be part of the velocity reduction zone or exterior thereto. Where desired, the recycle gas may then be passed through a filter 24 designed to remove small particles at high gas flow rates to prevent dust from contacting heat transfer surfaces and compressor blades.

The recycle gas is then compressed in a compressor 25 and then passed through a heat exchanger 26 wherein it is stripped of heat of reaction before it is returned to the bed. By constantly removing heat of reaction, no noticeable temperature gradient appears to exist within the upper portion of the bed. A temperature gradient will exist in the bottom of the bed in a layer of about 6 to 12 inches, between the temperature of the inlet gas and the temperature of the remainder of the bed. Thus, it has been observed that the bed acts to almost immediately adjust the temperature of the recycle gas above this bottom layer of the bed zone to make it conform to the temperature of the remainder of the bed thereby maintaining itself at an essentially constant temperature under steady state conditions. The recycle is then returned to the reactor at its base 18 and to the fluidized bed through distribution plate 20. The compressor 25 can also be placed upstream of the heat exchanger 26.

The distribution plate 20 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization at the base of the bed is, therefore, important, The distribution plate 20 serves this purpose and may be a screen, slotted plate, perforated plate, a plate of the bubble cap type, and the like. The elements of the plate may all be stationary, or the plate may be of the mobile type disclosed in U.S. Pat. No. 3,298,792. Whatever its design, it must diffuse the recycle gas through the particles at the base of the bed to keep them in a fluidized condition, and also serve to support a quiescent bed of resin particles when the reactor is not in operation. The mobile elements of the plate may be used to dislodge any polymer particles entrapped in or on the plate.

Hydrogen may be used as a chain transfer agent in the polymerization reaction of the present invention. The ratio of hydrogen/ethylene employed will vary between about 0 to about 2.0 moles of hyrogen per mole of the monomer in the gas stream.

Any gas inert to the catalyst and reactants can also be present in the gas stream. The activator compound is preferably added to the reaction system at the hottest portion of the gas which is usually downstream from heat exchanger 26. Thus, the activator may be fed into the gas recycle system from dispenser 27 thru line 27A.

Compounds of the structure $Zn(R_a)(R_b)$, wherein $R_a$ and $R_b$ are the same or different $C_1$ to $C_{14}$ aliphatic or aromatic hydrocarbon radicals, may be used in conjunction with hydrogen, with the catalysts of the present invention as molecular weight control or chain transfer agents, that is, to increase the melt index values of the copolymers that are produced. About 0 to 50, and preferably about 20 to 30, mols of the Zn compound (as Zn) would be used in the gas stream in the reactor per mol of titanium compound (as Ti) in the reactor. The zinc compound would be introduced into the reactor preferably in the form of a dilute solution (2 to 30 weight percent) in hydrocarbon solvent or absorbed on a solid diluent material, such as silica, of the types described above, in amounts of about 10 to 50 weight percent. These compositions tend to be pyrophoric. The zinc compound may be added alone, or with any additiional portions of the activator compound that are to be added to the reactor from a feeder, not shown, which could be positioned adjacent dispenser 27, near the hottest portion of the gas recycle system.

It is essential to operate the fluid bed reactor at a temperature below the sintering temperature of the polymer particles. To insure that sintering will not occur, operating temperatures below the sintering temperature are desired. For the production of ethylene copolymers in the process of the present invention an operating temperature of about 30° to 115° C. is preferred, and a temperature of about 75° to 95° C. is most preferred. Temperatures of about 75° to 90° C. are used to prepare products having a density of about 0.91 to 0.92, and temperatures of about 80° to 100° C. are used to prepare products having a density of about >0.92 to 0.94, and temperatures of about 90° to 115° C. are used to prepare products having a density of about >0.94 to 0.96.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or completely activated precursor composition is injected into the bed at a rate equal to its consumption at a point 30 which is above the distribution plate 20. Injecting the catalyst at a point above the distribution plate is an important feature of this invention. Since the catalysts used in the practice of the invention are highly active, injection of the fully activated catalyst into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots".

A gas which is inert to the catalyst such as nitrogen or argon is used to carry the partially or completely reduced precursor composition, and any additional activator compound or non-gaseous chain transfer agent that is needed, into the bed.

The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas is adjusted upwards or downwards to accomodate the change in rate of heat generation. This insures the maintenance of an essentially constant temperature in the bed. Complete instrumentation of both the fluidized bed and the recycle gas cooling system, is, of course, necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point 34 at or close to the distribution plate 20 and in suspension with a portion of the gas stream which is vented before the particules settle to preclude further polymerization and sintering when the particles reach their ultimate collection zone. The suspending gas may also be used, as mentioned above, to drive the product of one reactor to another reactor.

The particulate polymer product is conveniently and preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone. Valve 38 is then closed to await the next product recovery operation.

Finally, the fluidized bed reactor is equipped with an adequate venting system to allow venting the bed during start up and shut down. The reactor does not require the use of stirring means and/or wall scraping means.

The highly active supported catalyst system of this invention appears to yield a fluid bed product having an average particle size between about 0.005 to about 0.07 inches and preferably about 0.02 to about 0.04 inches.

The feed stream of gaseous monomer, with or without inert gaseous diluents, is fed into the reactor at a space time yield of about 2 to 10 pounds/hour/cubic foot of bed volume.

The term virgin resin or polymer as used herein means polymer, in granular form, as it is recovered from the polymerization reactor.

The following Examples are designed to illustrate the process of the present invention and are not intended as a limitation upon the scope thereof.

The properties of the polymers produced in the Examples were determined by the following test methods:

Density: For materials having a density <0.940, ASTM-1505 procedure is used and plaque is conditioned for one hour at 100° C. to approach equilibrium crystallinity. For materials having a density of ≧0.940, a modified procedure is used wherein the test plaque is conditioned for one hour at 120° C. to approach equilibrium crystallinity and is then quickly cooled to room temperature. All density values are reported as grams/cm$^3$. All density measurements are made in a density gradient column.

Melt Index (MI): ASTM D-1238—Condition E—Measured at 190° C.—reported as grams per 10 minutes.

Flow Rate (HLMI): ASTM D-1238—Condition F—Measured at 10 times the weight used in the melt index test above.

$$\text{Melt Flow Ratio } (MFR) = \frac{\text{Flow Rate}}{\text{Melt Index}}$$

productivity: a sample of the resin product is ashed, and the weight % of ash is determined; since the ash is essentially composed of the catalyst, the productivity is thus the pounds of polymer produced per pound of total catalyst consumed. The amount of Ti, Mg and Cl in the ash are determined by elemental analysis.

Film Rating: A sample of film is viewed with the naked eye to note the size and distribution of gels or other foreign particles in comparison to standard film samples. The appearance of the film, as thus compared to the standard samples is then given a rating on a scale of −100 (very poor) to +100 (excellent).

n-hexane extractables: (FDA test used for polyethylene film intended for food contact applications). A 200 square inch sample of 1.5 mil gauge film is cut into strips measuring 1"×6" and weighed to the nearest 0.1 mg. The strips are placed in a vessel and extracted with 300 ml of n-hexane at 50±1° C. for 2 hours. The extract is then decanted into tared culture dishes. After drying the extract in a vacuum desiccator, the culture dish is weighed to the nearest 0.1 mg. The extractables, normalized with respect to the original sample weight, is then reported as the weight fraction of n-hexane extractables.

bulk density: The resin is poured via ⅜" diameter funnel into a 100 ml graduated cylinder to 100 ml line without shaking the cylinder, and weighed by difference.

Molecular Weight Distribution (Mw/Mn): Gel Permeation Chromatography For resins with density <0.94: Styrogel Packing: (Pore Size Sequence is $10^7$, $10^5$, $10^4$, $10^3$, 60 A°) Solvent is Percholorethylene at 117° C. For resins with density ≧0.94: Styrogel Packing: (Pore Size Sequence is $10^7$, $10^6$, $10^5$, $10^4$, 60 A°) Solvent is ortho dichloro Benzene at 135° C. Detection for all resins: Infra red at 3.45μ

EXAMPLES

I. Preparation of Precursor Compositiion

In a 5 liter flask equipped with a mechanical stirrer, 16.0 g (0.168 Mol) of anhydrous MgCl$_2$ was mixed with 850 ml of pure tetrahydrofuran under nitrogen. The mixture was stirred at room temperature (~25° C.) while 13.05 g (0.069 Mol) of TiCl₄ was added dropwise. After complete addition, the contents of the flask were heated to reflux for about ½ to 1 hour to dissolve the solids. The system was cooled to room temperature and 3 liters of pure n-hexane was slowly added over a period of ¼ hour. A yellow solid precipitated. The supernatant was decanted and the solids were washed with 3X one liter of n-hexane. The solids were filtered and dried in a rotating evaporating flask at 40°-60° C. to give 55 g of solid precursor composition.

The precursor composition may be analyzed at this point for Mg and Ti content since some of the Mg and-/or Ti compound may have been lost during the isolation of the precursor composition. The empirical formulas used herein in reporting these precursor compositions are derived by assuming that the Mg and the Ti still exist in the form of the compounds in which they were first added to the electron donor compound and that all other residual weight in the precursor composition is due to the electron donor compound.

Analysis of the solid showed the following: Mg:6.1%, Ti:4.9%; which corresponds to TiMg$_{2.45}$Cl$_{8.9}$(THF)$_{7.0}$. THF means tetrahydrofuran.

II. Activation Procedures

Procedure A—This procedure relates to a multistep activation of the precursor composition. In this procedure the activation is conducted in such a way that the precursor composition is only partially reduced prior to the introduction thereof into the polymerization reactor, and then the remainder of the reduction process is completed within such reactor.

The desired weight of dry inert carrier material is charged to a mixing vessel or tank. For the examples described herein the amount of inert carrier is about 500 grams for silica and about 1000 grams for a polyethylene carrier. The inert carrier material is then admixed with sufficient amounts of anhydrous, aliphatic hydrocarbon diluent such as isopentane to provide a slurry system. This usually requires about 4 to 7 ml of diluent per gram of inert carrier. The desired weight of the precursor composition is then charged to the mixing vessel and thoroughly admixed with the slurry composition. The amount of precursor composition used in this procedure for making the catalysts in these examples is about 80 to 135 grams, with such precursor composition having an elemental titanium content of 1±0.1 millimole of Ti per gram of precursor composition.

The desired amount of activator compound needed to partially activate the precursor composition is added to the contents of the mixing vessel so as to partially activate the precursor composition. The amount of activator compound used in this regard provides an Al/Ti ratio in the partially reduced precursor composition of >0 to <10:1 and preferably of 4 to 8:1. The activator compound is added to the mixing tank in the form of a solution which contains about 20 weight percent of the activator compound (triethyl aluminum in these examples) in an inert aliphatic hydrocarbon solvent (hexane in these examples). The activation is accomplished by thoroughly mixing and contacting the activator compound with the precursor composition. All of the operations described above are conducted at room temperature, and at atmospheric pressure in an inert atmosphere.

The resulting slurry is then dried under a purge of dry inert gas such as nitrogen or argon, at atmospheric pressure at a temperature of ≦60° C. to remove the hydrocarbon diluent. This process usually requires about 3 to 5 hours. The resulting product is in the form of a dry free-flowing particulate material wherein the activated precursor composition is uniformly blended with the inert carrier. The dried product is stored under an inert gas.

Where additional activator compound is fed to the polymerization reactor in this Procedure A for the purposes of completing the activation of the precursor composition, it may be first absorbed on an inert carrier material such as silica or polyethylene, or, most preferably, it may be injected into the reaction zone as a dilute solution in a hydrocarbon solvent such as isopentane.

Where the activator compound is to be absorbed on a silica support, the two materials are mixed in a vessel containing about 4 ml of isopentane per gram of carrier material. The resulting slurry is then dried for about 3 to 5 hours under a purge of nitrogen at atmospheric pressure at a temperature of 65°±10° C. to remove the hydrocarbon diluent.

Where the activator compound is to be injected into the polymerization reaction system as a dilute solution, concentrations of about 5 to 10% by weight are preferred.

Regardless of the method used to introduce the activator compound into the polymerization reactor for the purpose of completing the activation of the precursor composition, it is added at a rate such as to maintain the Al/Ti ratio in the polymerization reactor at a level of ≧10 to 400:1 and preferably of ≧10 to 100:1.

Prior to being used herein, the silicas are dried at ≧200° C. for ≧4 hours.

Procedure B—In this procedure a complete activation of the precursor composition is accomplished by blending the precursor composition with, and thereby contacting it with, the activator compound which is absorbed on an inert carrier material.

The activator compound is absorbed on the inert carrier material by being slurried with the carrier material in an inert hydrocarbon solvent and by then drying the slurry to remove the solvent so as to provide a composition containing about 10 to 50 weight percent of activator compound. Thus, 500 grams of silica which has been previously dehydrated (at 800° C. for 4 hours) is charged to a mixing vessel.

The desired amount of activator compound, as a 20 weight percent solution in hydrocarbon solvent, such as hexane, is then added to the mixing vessel and mixed (slurried) with the inert carrier at room temperature and atmospheric pressure. The solvent is then removed by drying the resulting slurry at 65°±10° C. for about 3 to 5 hours at atmospheric pressure under a flowing stream of dry inert gas such as nitrogen. The dried composition is in the form of free flowing particles having the size of the carrier material.

About 500 grams of the dried silica supported activator compound (50/50 weight percent of silica/activator compound) is then added to a mixing vessel. The desired weight of precursor composition (80-100 grams) is also added to the mixing vessel. The materials are then thoroughly mixed for about 1 to 3 hours at room temperature at atmospheric pressure under a dry inert gas such as nitrogen or argon. The resulting composition is in the form of a physical admixture of dry free-flowing particles having a size of the order of 10 to 150 microns.

During the admixing operation the supported activator compound comes into contact with the precursor composition and completely activates it. During the resulting exothermic reaction the temperature of the catalyst composition should not be allowed to exceed 50° C. so as to avoid any significant deactivation of the catalyst.

The resulting activated composition has an Al/Ti ratio of about 10 to 50 and may be pyrophoric where it contains >10 weight percent of the activator compound. It is stored under a dry inert gas such as nitrogen or argon prior to being injected into the reactor.

EXAMPLES 1 TO 15

Ethylene was copolymerized with propylene or butene-1 (propylene in Examples 1 to 7 and butene-1 in Examples 8 to 15) in each of this series of 15 examples with catalyst formed as described above and as activated by Activation Procedure A to produce polymers having a density of >0.940. In each case the partially activated precursor composition had an Al/Ti mol ratio of 2.4 to 5.0 The completion of the activation of the precursor composition in the polymerization reactor was accomplished with triethyl aluminum as either a 2.6 or 5 weight % solution in isopentane so as to provide the completely activated catalyst in the reactor with an Al/Ti mol ratio of about 12 to 47.

Each of the polymerization reactions was continuously conducted for >1 hour after equilibrium was reached and under a pressure of about 300 psig and a gas velocity of about 5 to 6 times $G_{mf}$ in a fluid bed reactor system at a space time yield of about 3 to 6 lbs/hr/ft³ of bed space. The reaction system was as described in the drawing above. It has a lower section 10 feet high and 13½ inches in (inner) diameter, and an upper section which was 16 feet high and 23½ inches in (inner) diameter.

In several of the examples zinc diethyl was added during the reaction (as a 2.6 weight % solution in isopentane) to maintain a constant Zn/Ti mol ratio where the zinc diethyl was used, the triethyl aluminum was also added as a 2.6 weight % solution in isopentane.

Table I below lists, with respect to Examples 1 to 15 various operating conditions employed in such examples i.e., the weight % of precursor composition in the blend of silica and precursor composition; Al/Ti ratio in the partially activated precursor composition; Al/Ti ratio maintained in the reactor; polymerization temperature; % by volume of ethylene in reactor; $H_2$/ethylene mol ratio; comonomer $(C_x)/C_2$ mol ratio in reactor; catalyst productivity and Zn/Ti mol ratio. Table II below lists properties of the granular virgin resins made in Examples 1 to 15, i.e., density; melt index (M.I.); melt flow ratio (MFR); weight % ash; Ti content (ppm), bulk density and average particle size.

TABLE I

| | | | Reaction Conditions For Examples 1 to 15 | | | | | |
|---|---|---|---|---|---|---|---|---|
| Example | weight % precursor | Al/Ti ratio in part. act. precursor | Al/Ti ratio in reactor | Temp °C. | Vol % $C_2$ | $H_2/C_2$ mol ratio | $C_x/C_2$ mol ratio | catalyst productivity | Zn/Ti in reactor |
| 1 | 18.2 | 4.65 | 22.1 | 110 | 62.5 | 0.209 | 0.161 | 100,000 | 31.6 |
| 2 | 18.9 | 2.35 | 12.3 | 100 | 57.0 | 0.379 | 0.0479 | 125,000 | — |
| 3 | 18.1 | 4.67 | 25.8 | 110 | 57.2 | 0.401 | 0.0491 | 133,000 | — |
| 4 | 18.2 | 4.72 | 26.5 | 110 | 50.5 | 0.424 | 0.0758 | 100,000 | — |
| 5 | 22.0 | 3.65 | 47.0 | 100 | 70.0 | 0.206 | 0.0793 | 333,000 | 39 |
| 6 | 17.8 | 4.74 | 12.8 | 99.6 | 48.9 | 0.402 | 0.1503 | 111,000 | — |
| 7 | 18.2 | 4.72 | 23.5 | 93.8 | 57.2 | 0.214 | 0.167 | 167,000 | 34.3 |
| 8 | 18.2 | 4.65 | 23.2 | 95 | 63.0 | 0.206 | 0.162 | 167,000 | 33.7 |
| 9 | 18.2 | 4.65 | 21.0 | 110 | 59.8 | 0.207 | 0.153 | 143,000 | 29.7 |
| 10 | 18.1 | 4.68 | 22.5 | 110 | 63.0 | 0.254 | 0.0916 | 143,000 | 32.4 |
| 11 | 18.1 | 4.68 | 22.1 | 110 | 60.5 | 0.304 | 0.0899 | 143,000 | 31.6 |
| 12 | 18.1 | 4.68 | 20.9 | 99.3 | 36.0 | 0.239 | 0.0894 | 133,000 | 29.5 |
| 13 | 17.8 | 4.74 | 39.3 | 100 | 63.2 | 0.216 | 0.0948 | 250,000 | 31.8 |
| 14 | 17.8 | 4.74 | 13.3 | 99.7 | 52.2 | 0.407 | 0.1064 | 125,000 | — |
| 15 | 18.8 | 4.72 | 24.3 | 94.8 | 62.0 | 0.215 | 0.154 | 200,000 | 35.8 |

TABLE II

| | Properties of Polymers made in Examples 1 to 15 | | | | | | |
|---|---|---|---|---|---|---|---|
| Example | Density | M.I. | MFR | ash wt % | Ti ppm | bulk density | aver. part. size; inches |
| 1 | 0.9487 | 13.17 | 25.5 | 0.095 | 10 | 21.2 | 0.0317 |
| 2 | 0.9575 | 5.54 | 24.9 | 0.071 | 8.0 | 15.6 | 0.0284 |
| 3 | 0.9635 | 16.71 | 24.7 | 0.085 | 7.5 | 23.7 | 0.0225 |
| 4 | 0.9607 | 34.06 | 24.2 | 0.055 | 10.0 | 22.5 | 0.0250 |
| 5 | 0.9550 | 7.78 | 26.5 | 0.076 | 3.0 | 15.6 | 0.0291 |
| 6 | 0.9492 | 11.47 | 22.7 | 0.066 | 9.0 | 23.1 | 0.0274 |
| 7 | 0.9440 | 3.54 | 26.6 | 0.068 | 6.0 | 15.6 | 0.308 |
| 8 | 0.9416 | 4.92 | 26.7 | 0.076 | 6 | 15.6 | 0.0220 |
| 9 | 0.9431 | 17.63 | 26.0 | 0.081 | 7 | 18.7 | 0.0264 |
| 10 | 0.9514 | 23.9 | 23.2 | 0.102 | 7 | 20.0 | 0.0302 |
| 11 | 0.9525 | 34.9 | 23.8 | 0.089 | 7 | 21.2 | 0.0308 |
| 12 | 0.9503 | 8.85 | 26.3 | — | 7.5 | 16.8 | 0.0258 |
| 13 | 0.9505 | 8.36 | 25.2 | 0.073 | 4.0 | 18.7 | 0.0216 |
| 14 | 0.9478 | 12.69 | 23.0 | 0.055 | 8.0 | 19.3 | 0.0246 |
| 15 | 0.9431 | 5.47 | 25.9 | 0.081 | 5.0 | 18.7 | 0.0188 |

EXAMPLES 16 TO 28

Ethylene was copolymerized with propylene or butene-1 (propylene in Examples 16 to 17 and butene-1 in Examples 18 to 28) in each of this series of 14 examples with catalyst formed as described above and as activated by Activation Procedure A to produce polymers having a density of ≦0.940. In each case, the partially activated precursor composition had an Al/Ti mol ratio of 4.4 to 5.8. The completion of the activation of the precursor composition in the polymerization reactor was accomplished with triethyl aluminum (as a 5 weight % solution in isopentane in Examples 16 to 18 and 21 to 28, and adsorbed on silica, 50/50 weight %, in Examples 19 and 20) so as to provide the completely activated catalyst in the reactor with an Al/Ti mol ratio of about 29 to 140.

Each of the reaction were conducted as in Examples 1 to 15. Table III lists operating conditions used in Examples 16 to 28 and Table IV lists properties of the granular virgin resins made in such examples.

TABLE III

Reaction Conditions for Examples 16 to 29

| Example | Weight % precursor | Al/Ti ratio in part. act precursor | Al/Ti ratio in reactor | Temp °C. | Vol % $C_2$ | $H_2/C_2$ mol ratio | $C_x/C_2$ mol ratio |
|---|---|---|---|---|---|---|---|
| 16 | 8.3 | 5.8 | 40.5 | 90 | 41.7 | 0.492 | 0.486 |
| 17 | 8.3 | 5.8 | 50.8 | 90 | 39.7 | 0.566 | 0.534 |
| 18 | 20.1 | 4.50 | 88.3 | 85 | 56.3 | 0.148 | 0.450 |
| 19 | 19.8 | 4.40 | 26.7 | 90 | 50.2 | 0.350 | 0.350 |
| 20 | 19.8 | 4.40 | 26.7 | 85 | 54.1 | 0.157 | 0.407 |
| 21 | 6.9 | 5.08 | 42.0 | 85 | 49.2 | 0.209 | 0.480 |
| 22 | 6.9 | 5.08 | 33.6 | 85 | 46.5 | 0.208 | 0.482 |
| 23 | 6.9 | 5.08 | 28.8 | 85 | 42.1 | 0.206 | 0.515 |
| 24 | 8.3 | 5.8 | 124.6 | 90 | 45.1 | 0.456 | 0.390 |
| 25 | 8.3 | 5.8 | 80.8 | 90 | 42.7 | 0.365 | 0.396 |
| 26 | 8.3 | 5.8 | 52.0 | 90 | 48.4 | 0.350 | 0.397 |
| 27 | 8.3 | 5.8 | 140.1 | 90 | 42.6 | 0.518 | 0.393 |
| 28 | 8.3 | 5.8 | 63.5 | 90 | 40.8 | 0.556 | 0.391 |

TABLE IV

Properties of Polymers Made in Examples 16 to 29

| Example | Density | M.I. | MFR | bulk density | average particle size, inches |
|---|---|---|---|---|---|
| 16 | 0.927 | 22.0 | 24.4 | 16.8 | 0.0230 |
| 17 | 0.929 | 24.0 | 23.4 | 17.5 | 0.0230 |
| 18 | 0.925 | 0.61 | 27.1 | 16.8 | 0.0300 |
| 19 | 0.931 | 12.0 | 26.7 | 16.8 | 0.0275 |
| 20 | 0.923 | 1.47 | 28.2 | 15.6 | 0.0404 |
| 21 | 0.919 | 3.41 | 25.9 | 16.8 | 0.0550 |
| 22 | 0.925 | 2.90 | 24.5 | 17.5 | 0.0590 |
| 23 | 0.919 | 3.10 | 24.6 | 16.2 | 0.0570 |
| 24 | 0.929 | 16.0 | 24.1 | 17.3 | 0.0230 |
| 25 | 0.929 | 15.3 | 24.0 | 16.6 | 0.0234 |
| 26 | 0.928 | 11.5 | 24.1 | 16.7 | 0.0248 |
| 27 | 0.929 | 20.7 | 24.3 | 17.3 | 0.0258 |
| 28 | 0.929 | 29.2 | 26.1 | 16.8 | 0.0206 |

Unsaturation is measured with a infrared spectrophotomer (Perkin Elmer Model 21). Pressings made from the resin which are 25 mils in thickness are used as test specimens. Absorbance is measured at $10.35\mu$ for trans vinylene unsaturation, $11.0\mu$ for terminal vinyl unsaturation and $11.25\mu$ for pendant vinylidene unsaturation. The absorbance per mil of thickness of the pressing is directly proportional to the product of unsaturation concentration and absorptivity. Absorptivities are taken from the literature values of R. J. deKock, et al., J. Polymer Science, Part B, 2, 339 (1964).

What is claimed is:

1. A continuous process for producing ethylene copolymer containing $\geq 90$ mol percent of ethylene and $\leq 10$ mol percent of one or more $C_3$ to $C_8$ alpha olefins with a Ti containing catalyst at a productivity of $\geq 50,000$ pounds of polymer per pound of Ti under a pressure of $<1000$ psi in a gas phase fluid bed reaction said polymer being produced in granular form and having a density of $\geq 0.91$ to $\leq 0.96$ and a melt flow ratio of $\geq 22$ to $\leq 32$, which comprises copolymerizing ethylene with $>0$ to 0.9 mols of one or more $C_3$ to $C_8$ αolefin monomers per mol of ethylene at a temperature of about 30° to 115° C. by contacting the monomer charge with, in the presence of about 0 to 2.0 mol of hydrogen per mol of ethylene in a gas phase reaction zone, particles of a non-comminuted catalyst system comprising an activated precursor composition wherein said precursor composition has the formula $Mg_mTi_1(OR)_nX_p[ED]_q$ wherein
m is $\geq 0.5$ to $\leq 56$
n is 0 or 1
p is $\geq 6$ to $\leq 116$
q is $\geq 2$ to $\leq 85$
R is a $C_1$ to $C_{14}$ aliphatic or aromatic hydrocarbon radical, or COR' wherein R' is a $C_1$ to $C_{14}$ aliphatic or aromatic hydrocarbon radical,
X is selected from the group consisting of Cl, Br, I or mixtures thereof,
ED is a liquid organic electron donor compound in which said precursor composition and the Ti and Mg components thereof are soluble and which is selected from the group consisting of alkyl esters of aliphatic and aromatic carboxylic acids, aliphatic ethers, cyclic ethers and aliphatic ketones,
said precursor composition being diluted with at least one solid inert carrier material and being either
completely activated, prior to the feeding of the activated precursor composition to said reaction zone with $\geq 10$ to $\leq 400$ mols of carrier absorbed activator compound per mol of titanium compound in said precursor composition so as to thereby prepare a solid dry catalyst composition without having to heat said catalyst composition above 50° C., or
partially activated with $>0$ to $<10$ mols of activator compound per mol of titanium compound in said precursor composition prior to feeding of the activated precursor composition to said reaction zone and then being completely activated in said reaction zone with $\geq 10$ to $\leq 400$ mols of activator compound per mol of titanium compound in said precursor composition, and
said activator compound having the formula $Al(R'')_cX'_dH_e$ wherein X' is Cl or OR''', R'' and R''' are the same or different and are $C_1$ to $C_{14}$ saturated hydrocarbon radicals
d is 0 to 1.5,
e is 0 or 1, and
$c+d+e=3$.

2. A process as in claim 1 in which a solution of said precursor composition is prepared by dissolving at least one magnesium compound and at least one titanium compound in said electron donor compound and by then recovering said precursor composition by precipitating or crystallizing it from said solution, said magnesium compound having the structure $$MgX_2$$

said titanium compound having the structure $$Ti(OR)_aX_b$$

wherein a is 0 or 1, b is 2 to 4 and a+b=3 or 4, and said magnesium compound, said titanium compound and said electron donor compound being employed in such amounts as to satisfy the values of m, n, p and q.

3. A process as in claim 2 in which said magnesium compound comprises $MgCl_2$.

4. A process as in claim 3 in which said electron donor compound comprises at least one ether.

5. A process as in claim 4 in which said electron donor compound comprises tetrahydrofuran.

6. A process as in claim 4 in which said titanium compound comprises $TiCl_4$.

7. A process as in clam 6 in which said inert carrier material comprises silica.

8. A process as in claim 1 in which said diluted precursor composition is partially activated with >0 to <10 mols of activator compound per mol of titanium in said precursor composition prior to the introduction of said precursor composition into said reaction zone.

9. A process as in claim 1 which is conducted under a mass gas flow rate of about 1.5 to 10 times $G_{mf}$.

10. A process as in claim 9 which is conducted at a productivity of ≧100,000 pounds of polymer per pound of Ti.

11. A process as in claim 1 in which ethylene is copolymerized with propylene.

12. A process as in claim 1 in which ethylene is copolymerized with butene-1.

* * * * *